Aug. 16, 1955     L. MOUTTET     2,715,334
APPARATUS FOR CHECKING WATCH BARRELS
Filed July 8, 1954     2 Sheets-Sheet 1

Inventor:
León Mouttet
by: J. Delatter Sigury
Attorney

Inventor:
Leon Mouttet
by: J. Delattre-Seguy
Attorney

United States Patent Office 2,715,334
Patented Aug. 16, 1955

2,715,334

APPARATUS FOR CHECKING WATCH BARRELS

Leon Mouttet, Morges, Switzerland

Application July 8, 1954, Serial No. 442,001

Claims priority, application Switzerland August 18, 1953

7 Claims. (Cl. 73—161)

My invention has for object an apparatus for checking watch barrels. According to a primary feature of my invention, the said apparatus includes a rotary spindle provided with a clamp adapted to hold fast the spindle of the watch barrel to be checked, the said spindle controlling on one hand a revolution counter and on the other hand a dynamometer indicating the torque to which the spindle is submitted, in a manner such that the association of the said revolution counter and dynamometer allows measuring the torque of the spring contained in the watch barrel for any predetermined degree of winding of the spring.

I have illustrated by way of example in accompanying drawing a preferred embodiment of the apparatus according to my invention. In the said drawing.

Figure 1:
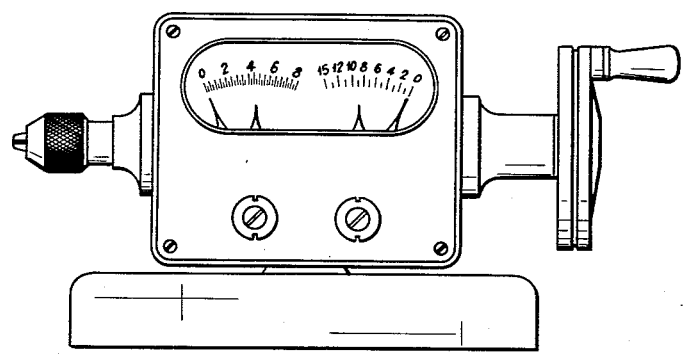
Fig. 1 is an elevational view of the apparatus.
Figure 2:
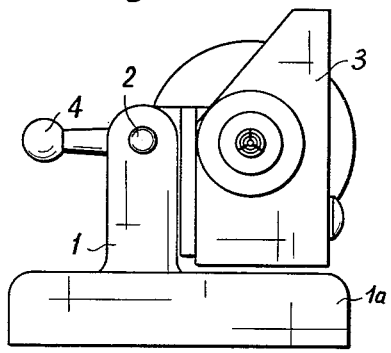
Fig. 2 is a side view thereof.
Figure 3:
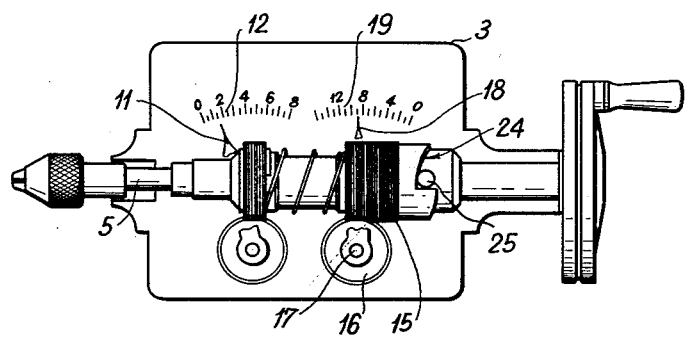
Fig. 3 is an elevational view of a section of the apparatus, the casing being shown open.

The apparatus illustrated includes a frame 1 to which is pivotally secured at 2 a casing 3. The pivotal connection 2 is of the easy friction type whereby a lever 4 may be used to give the casing 3 a more or less inclined slope with reference to the support 1a carrying the frame 1.

The apparatus includes a spindle 5 (Fig. 4) revolubly carried inside the casing 3 and provided at one end with a clamp 6 adapted to engage the spindle 7 of a watch barrel 8 held by the operator. The spindle 5 is rigid with a worm 9 meshing with a worm wheel 10 carrying the hand 11 of a revolution counter. This hand moves over a scale 12 graduated say between 0 and 8 revolutions.

The spindle 5 carries, furthermore, a sleeve 13 revolving in unison with the spindle 5 as provided by the key 14 and adapted to be shifted axially over the latter against the action of a coiled spring. The said sleeve is provided with a series of parallel annular grooves 15 meshing with a toothed wheel 16 revolubly carried by a spindle perpendicular to the axis of the sleeve and carrying the hand 18 of a dynamometer indicating the value of the torque to which the spindle 5 is submitted. The hand 18 moves over a scale 19 of grams per centimeter or the like units, the scale being graduated e. g. for the range extending between zero and 150 grams. The gauging is provided for a barrel of a predetermined diameter and therefore the apparatus is accompanied by a chart giving out the corrections to be made to the reading when checking watch barrels of different diameters.

Since the hand 18 is actuated by the axial movements of the sleeve 13 and since it is intended to indicate the torque to which the spindle 5 is submitted, means are provided for producing an axial shifting of the sleeve the extent of which shifting depends on the torque to which the latter is submitted. These means are as follows: the spindle 5 is controlled by a crank 20 rigid with a sleeve 21 revolubly carried by the casing 3 in alignment with the axis of the spindle. The said sleeve is connected with the spindle 5 through a coil spring 22 one end of which is secured to the sleeve and the other to a further sleeve 23 angularly rigid with the spindle. This arrangement produces, when the spindle 5 is controlled by the crank 20, a relative angular shifting of the crank with reference to the spindle, which shifting depends on the transmitted torque. The edge of the sleeve 13 facing the crank assumes a helically sloping shape at 24 and engages two pins 25 radially secured to the sleeve 21 rigid with the crank. When the crank is angularly shifted with reference to the spindle 5, the pins 25 cooperate with the helical edge 24 so as to shift the sleeve 13 axially with reference to the spindle 5 and thereby to actuate the dynamometer.

Figure 4:
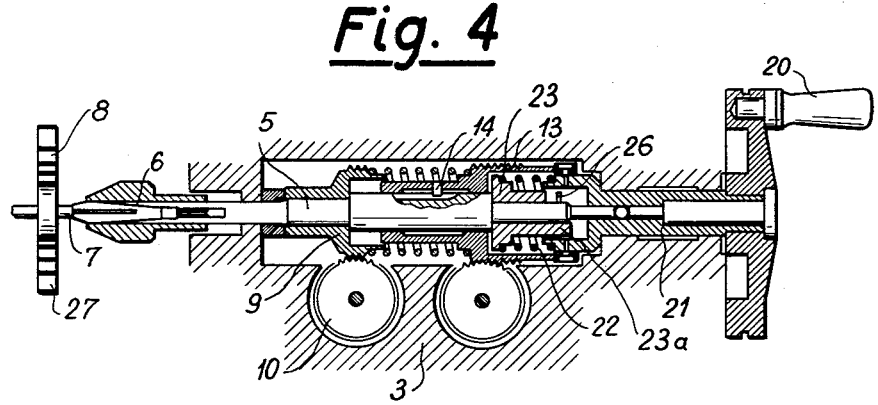
Fig. 4 is a cross-sectional view of a detail of the apparatus on an enlarged scale.

The sleeve 21 is also rigid with an inner pin 26 which, for sake of clearness, is shown as if it were in the plane of Fig. 4 whereas, in practice, when the different parts of the apparatus occupy the positions illustrated, the said pin 26 is perpendicular to the said plane of Fig. 4. The pin 26 is adapted to abut against an extension 23a of an angular section of the sleeve 23 and limits thus the relative angular shifting between the crank and the spindle.

By reason of the associatoin of the revolution counter with the dynamometer, the apparatus allows measuring the force developed by the spring 27 of the watch-barrel for a predetermined number of revolutions. Furthermore, when checking watch barrels provided with sliding flanges, the apparatus allows finding out whether the flanges are accurately adjusted or whether, on the contrary, they begin sliding too early or too late. As a matter of fact, the hand 18 is shifted suddenly as soon as the sliding begins and it is sufficient to read on the scale 19 the peak value reached by the needle in order to ascertain whether the said sliding is actually too early or too late.

What I claim is:

1. An apparatus for checking a watch-barrel provided with a spindle and a spring, comprising a casing, a spindle revolubly carried by the said casing, a clamp carried by the said spindle and adapted to hold the spindle of the watch-barrel fast in alignment with the said revoluble spindle, a revolution counter controlled by the said revoluble spindle, a sleeve coaxial with and angularly rigid with the revoluble spindle, adapted to be shifted longitudinally over the latter and provided with a series of parallel annular grooves, a toothed wheel meshing with the annularly grooved sleeve the axis of which is perpendicular to that of the said sleeve, a dynomometer controlled by the said toothed wheel, means adapted to exert a torque on the revoluble spindle and sleeve arrangement and to shift axially the sleeve over the revoluble spindle by amounts depending on the value of the said torque, the dynamometer being adapted to indicate the torque to which the revoluble spindle is submitted and thereby to define the torque developed by the barrel spring for any value indicated by the revolution meter.

2. An apparatus for checking a watch-barrel provided with a spindle and a spring, comprising a casing, a spindle revolubly carried by the said casing, a clamp carried by the said spindle and adapted to hold the spindle of the watch barrel fast in alignment with the said revoluble spindle, a worm coaxially rigid with the said revoluble spindle, a worm wheel meshing with said worm, a revolution counter controlled by the said worm, a sleeve coaxial with and angularly rigid with the revoluble spindle, adapted to be shifted longitudinally over the latter and provided with a series of parallel annular grooves, a toothed wheel meshing with the annularly grooved sleeve the axis of which is perpendicular to that of the said sleeve, a dynamometer controlled by the said toothed wheel and means adapted to exert a torque on the revoluble spindle and sleeve arrangement and to shift axially the sleeve over the revoluble spindle by amounts depending on the value of the said torque.

3. An apparatus for checking a watch-barrel provided with a spindle and a spring, comprising a casing, a spindle revolubly carried by the said casing, a clamp carried by the said spindle and adapted to hold the spindle of the watch-barrel fast in alignment with the said revoluble spindle, a revolution counter controlled by the said revoluble spindle, a sleeve coaxial with and angularly rigid with the revoluble spindle, adapted to be shifted longitudinally over the latter and provided with a series of parallel annular grooves, a toothed wheel meshing with the annularly grooved sleeve the axis of which is perpendicular to that of the said sleeve, a dynamometer controlled by the said toothed wheel, a rotary crank, elastic means operatively connecting the crank with the revoluble spindle, means whereby the relative angular shifting of the said crank with reference to the revoluble spindle against the action of the elastic means produces an axial shifting of the sleeve over the revoluble spindle by amounts depending on the value of the torque applied to the said revoluble spindle and sleeve arrangement and thereby on the value of the antagonistic torque developed by the barrel spring.

4. An apparatus for checking a watch-barrel provided with a spindle and a spring, comprising a casing, a spindle revolubly carried by the said casing, a clamp carried by the said spindle and adapted to hold the spindle of the watch-barrel fast in alignment with the said revoluble spindle, a revolution counter controlled by the said revoluble spindle, a sleeve coaxial with and angularly rigid with the revoluble spindle, adapted to be shifted longitudinally over the latter, a dynamometer controlled by the axial shifting of the sleeve over the revoluble spindle, a rotary crank, elastic means connecting the crank with the revoluble spindle, means whereby the relative angular shifting of the said crank with reference to the revoluble spindle against the action of the elastic means produces an axial shifting of the sleeve over the revoluble spindle by amounts depending on the value of the torque applied to the said revoluble spindle and sleeve arrangement and thereby on the value of the antagonistic torque developed by the barrel spring.

5. An apparatus for checking a watch-barrel provided with a spindle and a spring, comprising a casing, a spindle revolubly carried by the said casing, a clamp carried by the said spindle and adapted to hold the spindle of the watch-barrel fast in alignment with the said revoluble spindle, a revolution counter controlled by the said revoluble spindle, a sleeve coaxial with and angularly rigid with the revoluble spindle, adapted to be shifted longitudinally over the latter and provided at one end with an edge sloping gradually away from a predetermined plane perpendicular to the axis of the sleeve, a dynamometer controlled by the axial shifting of the sleeve over the revoluble spindle, a rotary crank, elastic means operatively connecting the crank with the revoluble spindle, and a pin positively controlled by the rotary crank, extending radially with reference to the sleeve and engaging the sloping edge of the latter, whereby the relative angular shifting of the said crank with reference to the revoluble spindle against the action of the elastic means produces an axial shifting of the sleeve over the revoluble spindle by amounts depending on the value of the torque applied to the said revoluble spindle and sleeve arrangement and thereby on the value of the antagonistic torque developed by the barrel spring.

6. An apparatus for checking a watch-barrel provided with a spindle and a spring, comprising a casing, a spindle revolubly carried by the said casing, a clamp carried by the said spindle and adapted to hold the spindle of the watch-barrel fast in alignment with the said revoluble spindle, a revolution counter controlled by the said revoluble spindle, a member angularly rigid with and longitudinally shiftable over the revoluble spindle, a dynamometer controlled by the said slidable member, means adapted to exert a torque on the revoluble spindle and slidable member and to shift axially the slidable member over the revoluble spindle by amounts depending on the value of the said torque, the dynamometer being adapted to indicate the torque to which the revoluble spindle is submitted and thereby to define the torque developed by the barrel spring for any value indicated by the revolution meter.

7. An apparatus for checking a watch-barrel provided with a spindle and a spring, comprising a casing, a spindle revolubly carried by the said casing, a clamp carried by the said spindle and adapted to hold the spindle of the watch-barrel fast in alignment with the said revoluble spindle, a revolution counter controlled by the said revoluble spindle, a member angularly rigid with and longitudinally shiftable over the revoluble spindle, a dynamometer controlled by the said slidable member, a rotary crank, elastic means connecting the crank with the revoluble spindle, means whereby the relative angular shifting of the said crank with reference to the revoluble spindle against the action of the elastic means produces an axial shifting of the slidable member over the revoluble spindle by amounts depending on the value of the torque applied to the said revoluble spindle and slidable member arrangement and thereby on the value of the antagonistic torque developed by the barrel spring.

References Cited in the file of this patent

UNITED STATES PATENTS

| Number | Name | Date |
|---|---|---|
| 891,018 | Vawter | June 16, 1908 |
| 950,511 | Johnston | Mar. 1, 1910 |
| 1,120,838 | Miller | Dec. 15, 1914 |
| 2,182,519 | Handy | Dec. 5, 1939 |
| 2,589,401 | Krahulic | Mar. 18, 1952 |
| 2,655,039 | Van Haaften | Oct. 13, 1953 |

FOREIGN PATENTS

| 393,594 | Germany | Apr. 5, 1924 |